United States Patent
Abjanic et al.

(10) Patent No.: US 7,162,542 B2
(45) Date of Patent: Jan. 9, 2007

(54) CASCADING NETWORK APPARATUS FOR SCALABILITY

(75) Inventors: John B. Abjanic, San Diego, CA (US); Matthew S. Ellis, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/741,805

(22) Filed: Dec. 22, 2000

(65) Prior Publication Data

US 2004/0230660 A1  Nov. 18, 2004

Related U.S. Application Data

(63) Continuation-in-part of application No. 09/566,800, filed on May 8, 2000, and a continuation-in-part of application No. 09/562,104, filed on May 1, 2000, which is a continuation-in-part of application No. 09/549,041, filed on Apr. 13, 2000, now Pat. No. 6,732,175.

(51) Int. Cl.
*G06F 15/16* (2006.01)

(52) U.S. Cl. ............... 709/246; 709/203; 709/239; 379/221.01; 708/204

(58) Field of Classification Search ............... 709/217, 709/223, 224, 229, 238, 245, 203, 239, 246; 379/221.01; 708/204
See application file for complete search history.

(56) References Cited

U.S. PATENT DOCUMENTS 5,742,762 A * 4/1998 Scholl et al. ............... 709/223
5,867,153 A * 2/1999 Grandcolas et al. ........ 709/217
6,006,264 A   12/1999 Colby et al.
6,144,990 A * 11/2000 Brandt et al. ............... 709/229
6,167,448 A * 12/2000 Hemphill et al. ........... 709/224
6,192,406 B1 * 2/2001 Ma et al. .................... 709/226
6,195,689 B1 * 2/2001 Bahlmann ................... 709/217
6,226,675 B1 * 5/2001 Meltzer et al. ............. 709/223
6,430,624 B1 * 8/2002 Jamtgaard et al. .......... 709/217
6,442,589 B1 * 8/2002 Takahashi et al. .......... 709/203
6,470,389 B1 * 10/2002 Chung et al. ............... 709/227
6,502,193 B1 * 12/2002 Barber ....................... 709/220
6,507,857 B1 * 1/2003 Yalcinalp ................... 715/513
6,553,000 B1 * 4/2003 Ganesh et al. ............. 709/241
6,601,108 B1 * 7/2003 Marmor ..................... 709/246
6,650,641 B1 * 11/2003 Albert et al. ............... 709/245
6,735,169 B1 * 5/2004 Albert et al. ............... 370/229
6,742,045 B1 * 5/2004 Albert et al. ............... 709/238
6,772,216 B1 * 8/2004 Ankireddipally et al. ... 709/230
6,854,120 B1 * 2/2005 Lo et al. ..................... 719/311

FOREIGN PATENT DOCUMENTS

EP      1 003 100 A2   5/2000
WO      WO 00/56033     9/2000

OTHER PUBLICATIONS

Apostolopoulos, et al., "Design, Implementation and Performance of a Content-Based Switch," IEEE INFOCOM, 19th Annual Joint Conference of the IEEE Computer and Communications Societies, Isreal Mar. 26-30, 2000, pp. 1117-1126, Piscataway, NJ, USA.
International Search Report, European Patent Office, International Application No.: PCT/US 01/44638, May 10, 2002, pp. 1-5.

* cited by examiner

*Primary Examiner*—Jeffrey Pwu
*Assistant Examiner*—Phuoc H. Nguyen
(74) *Attorney, Agent, or Firm*—Kacvinsky LLC

(57) ABSTRACT

Cascading network apparatus, such as a validator, a transformer and a switch, or combination thereof, as example.

22 Claims, 14 Drawing Sheets

CASCADING NETWORK APPARATUS FOR SCALABILITY

CROSS-REFERENCE TO RELATED APPLICATIONS

This application is a continuation-in-part of U.S. application Ser. No. 09/566,800, filed May 8, 2000 entitled "SCALABLE NETWORK APPARATUS FOR CONTENT BASED SWITCHING OR VALIDATION ACCELERATION," which is a continuation-in-part of U.S. application Ser. No. 09/549,041, filed Apr. 13, 2000 now U.S. Pat. No. 6,732,175, entitled "A NETWORK APPARATUS FOR SWITCHING BASED ON CONTENT OF APPLICATION DATA" and U.S. application Ser. No. 09/562,104, filed May 1, 2000, entitled "A NETWORK APPARATUS FOR VALIDATING DOCUMENTS," all of which are incorporated herein by reference.

FIELD

The invention generally relates to computers and computer networks and in particular to a technique for cascading network

BACKGROUND

While increasingly more successful in their roles as store and forward data systems, computer networks such as the Internet are experiencing tremendous growth as transaction-based, mission critical business applications, Web site owners, and business servers are overwhelmed by explosive traffic growth.

XML, or extensible Markup Language v. 1.0 was adopted by the World Wide Web Consortium (W3C) on Feb. 10, 1998. XML provides a structured syntax for data exchange. XML is a markup language, like Hypertext Markup Language (HTML). Most markup languages, like HTML, are fixed markup languages. That is, the fixed markup languages, such as HTML, include a set of fixed tags for crafting a document. On the other hand, XML does not define a fixed set of tags, but rather, only defines a syntax or structured format through which users can define their own set of XML tags. There presently are a number of XML based languages which define their own set of tags using the XML syntax. XML has the further advantage because the actual data is separated from the presentation of the data, in contrast with HTML which combines these two items. As a result, XML has the potential to become a standard by which most computers, servers and applications will exchange or communicate data.

As a result, there is a need to provide network apparatus that are scalable to accommodate such explosive growth in Internet traffic. It is also desirable to allow such network apparatus to process or manipulate information in a variety of formats, such as XML.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention is limited only by the terms of the appended claims.

The following represents brief descriptions of the drawings, wherein.

DETAILED DESCRIPTION

I. Content Based Switching

Figure 1:
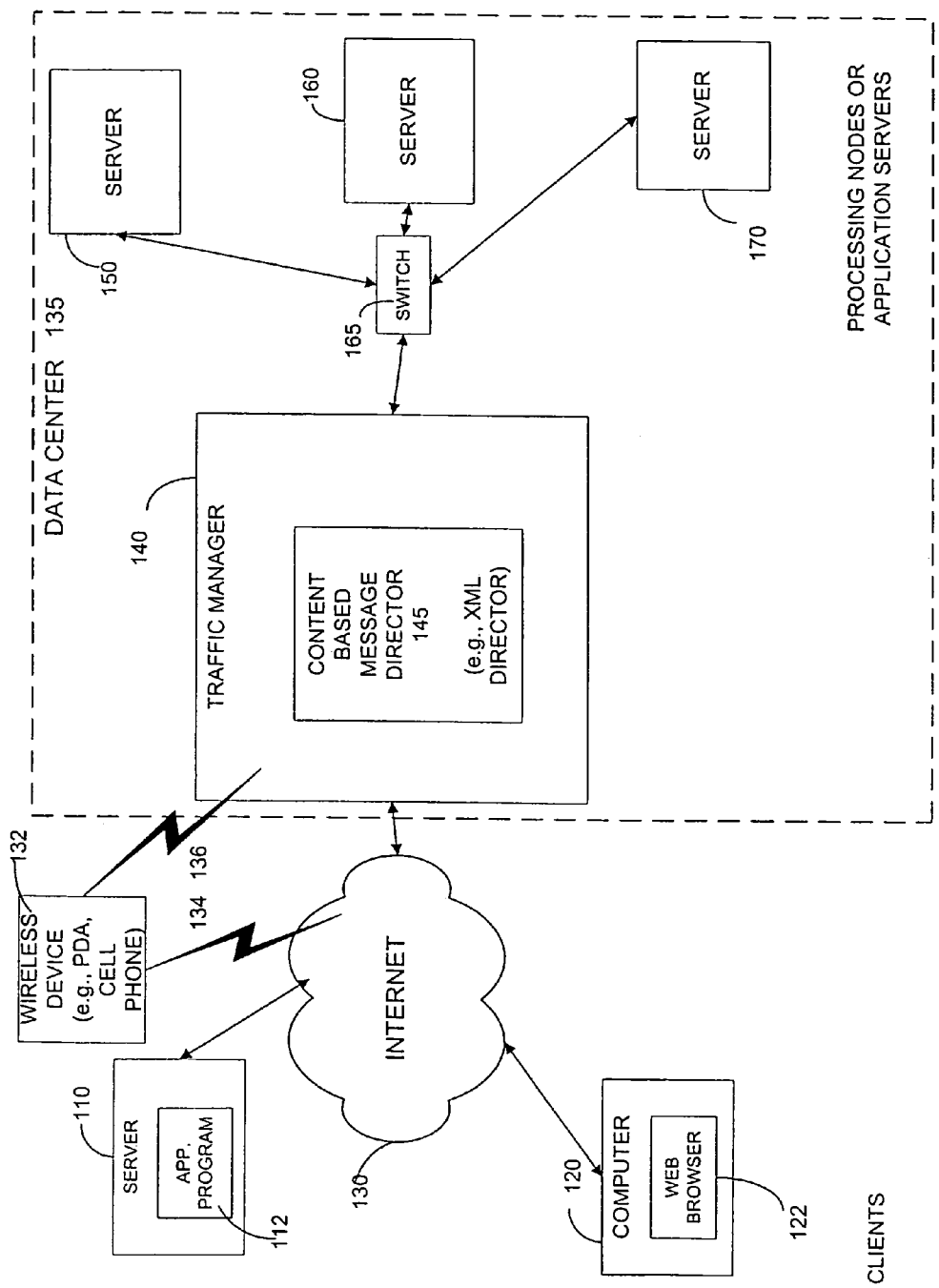
FIG. 1 is a block diagram of a network system according to an example embodiment.

Referring to the Figures in which like numerals indicate like elements, FIG. 1 is a block diagram of a network system according to an example embodiment. As shown in FIG. 1, a variety of clients may be coupled or connected to a data center 135 via a network, such as the Internet 130. The clients, for example, may include a server 110 that includes an application program 112, a computer 120 (such as a personal computer or laptop) that may include a web browser 122 and a wireless device 132, such as a personal digital assistant (PDA) or a wireless (or cellular) telephone. Wireless device 132 may be coupled to the Internet 130 or to a data center 135 via communications links 134 and 136, respectively. Links 134 and 136 each may include one or more of a wireless link, such as a cellular link or other link, or a wireline link. Each of the clients, including server 110, computer 120 and device 132 can send and receive messages over the Internet 130 and may use a variety of different protocols or transports.

The data center 135 is provided for sending, receiving and processing a wide variety of messages, requests, business transactions, purchase orders, stock quotes or stock trades, and other information. The data center 135 includes several processing nodes, such as servers, including server 150, server 160 and server 170 for handling the various orders, business transactions and other requests. The different servers in data center 135 may be allocated to provide different services, or even different levels of services. According to an example embodiment, the clients and the data center 135 exchange business transaction information or other information by sending and receiving XML messages, which may include data provided in XML or in a XML based language, or messages based upon another type of structured syntax for data interchange.

The various servers, such as servers 150,160 and 170, are coupled to a traffic manager 140 via a switch 165. Traffic manager 140 may perform a variety of functions relating to the management of traffic, including load balancing, for example, balancing the load of incoming messages or requests across the available servers according to some policy, such as round-robin, least number of connections, or other load balancing technique.

Referring to the clients again in FIG. 1, application program 112 may be a business program or a program for managing inventory, orders or other business transactions. For example, application program 112 may automatically and electronically detect that inventory has decreased below a threshold value and then automatically generate and send a purchase order to a supplier's server at data center 135 to request a shipment of additional supplies or inventory. Thus, server 110 may initiate, for example, a business-to-business (B2B) transaction by sending an electronic order to the supplier's remote server located at data center 135.

As a another example, web browser 122 may request web pages, business information or other information from a remote server, for example, located at data center 135. Web browser 122, may also send or post purchase orders, business transactions or other business information to a remote server, which may be located at data center 135. Wireless device 132 may receive information or data related to purchase orders, business transactions, web pages, stock quotes, game scores and the like from one or more remote servers, such as servers located at data center 135.

According to an embodiment, the server 110, computer 120 and wireless device 132 each may communicate or interchange data with one or more remote servers, such as servers 150,160 and 170, by sending and receiving XML data, which may be application data that is encoded or formatted according to the XML standard or according to one or more XML based languages.

According to an example embodiment, the traffic manager 140 includes a content based message director 145 to direct or switch messages to a selected server based upon the content of application data, such as business transaction information, which may be provided as XML data as an example. Traffic manager 140 and/or message director 145 may be software, hardware or a combination of both, and may even be provided on or as part of a network processor. It should be noted that director 145 may operate by itself, or as part of a larger network apparatus, such as part of a traffic manager 140.

According to an example embodiment, because of the advantages of XML, application data can advantageously exchanged between the servers of data center 135 and one or more clients or computing nodes by sending and receiving messages that include application data that is encoded or formatted according to the XML standard. Therefore, according to an embodiment, director 145 may be a XML director because it directs or switches the incoming message to a particular server based upon the XML data in the message. The XML data preferably complies with the format or syntax required by the XML standard. A document that uses tag formats, such as start tags and end tags, and other syntax or markup data that complies with the XML standard is considered to be a "well-formed" XML document.

Therefore, in an exemplary embodiment, content based message director 145 is a XML director. However, it should be understood that director 145 can direct or switch messages having basically any type of structured syntax, including any type of markup language.

An advantageous aspect of the embodiment of the traffic manager 140 and director 145 shown in FIG. 1 is that the traffic manager 140 and the director 145 are located in front of the one or more application servers or processing nodes. By locating the traffic manager 140 and director 145 in a computer, server or computing system in front of the processing nodes or servers (as shown in FIG. 1), for example, coupled between the network 130 and the servers, the traffic management functionality and the functionality of the director 145 can be off-loaded from an application server to a separate and/or dedicated network apparatus or network system. This can advantageously relieve the processing nodes or application servers from this additional processing overhead.

Alternatively, the director 145 may include a built-in switch with a plurality of output ports (physical ports), with a server coupled to each physical output port. In such case, a group of servers may have the same IP address or Media Access Control (MAC) address, or could have different addresses. The director 145 then would simply output or switch or forward the packet, including the message containing the XML business transaction information, via one of the physical output ports to a particular server. Regardless whether the director 145 includes a built-in switch or uses switch 165 to switch the messages to the servers, the director 145 switches or directs the messages to various servers. Switch 165 and director 145 may also switch the packet based upon other information in the packet, such as a source address or destination address.

Figure 2:
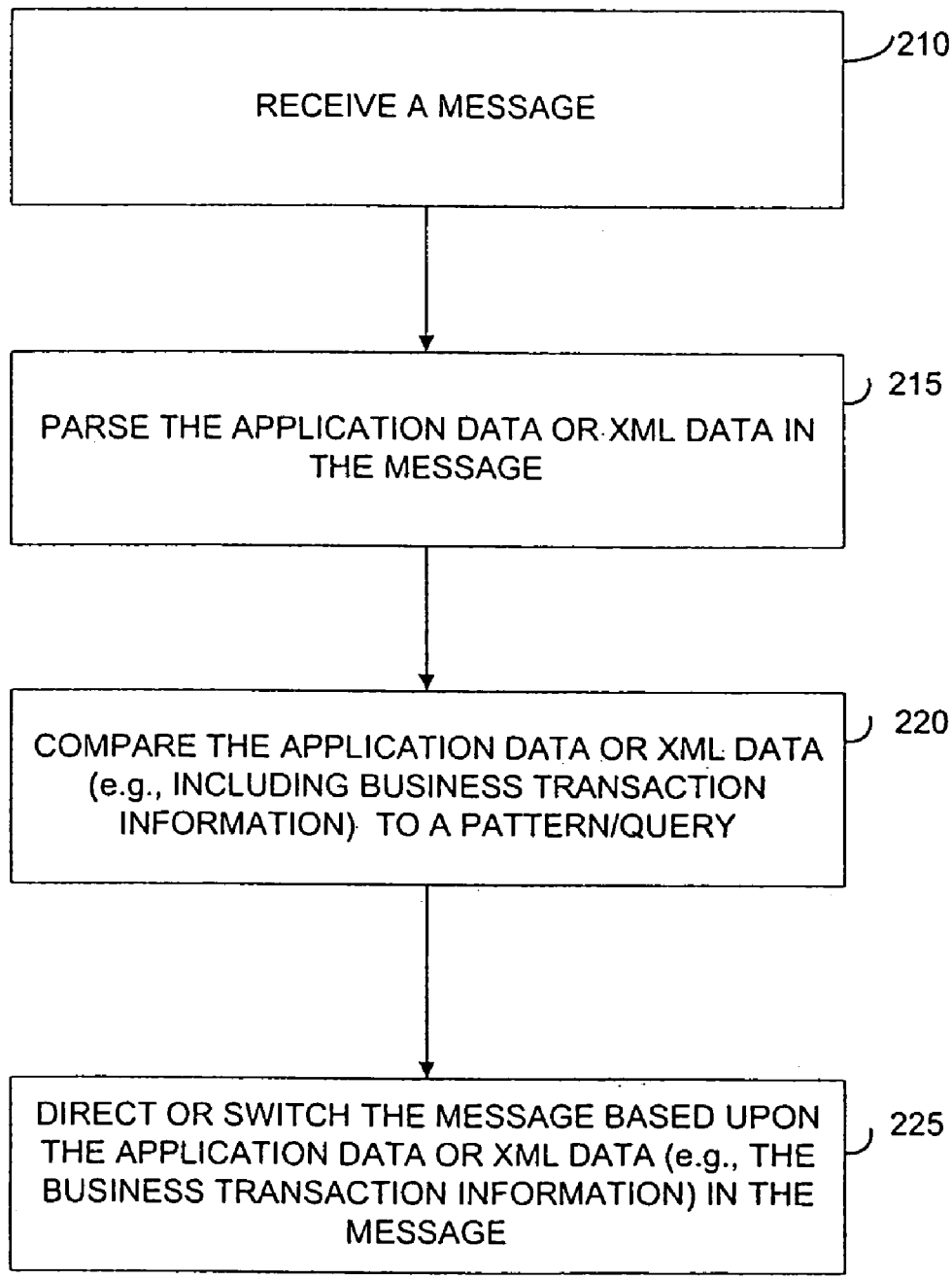
FIG. 2 is a flow chart illustrating an operation of content based message director according to an example embodiment.

FIG. 2 is a flow chart illustrating an operation of content based message director according to an example embodiment. At block 210, the director 145 receives a message. The message may be sent over any transport or protocol(s), such as Transmission Control Protocol (TCP), File Transfer Protocol (FTP), Simple Mail Transfer Protocol (SMTP), Wireless Application Protocol (WAP, which may be used to send and receive information with wireless devices), Hypertext Transfer Protocol (HTTP), etc. The general teachings and the operation of the invention are not dependent upon any particular transport or protocol, but rather are transport-independent.

A HTTP Post is an example of a message. The format for an HTTP Post message (or HTTP request) may be presented as:

--- request-line (the URL); identifies a program for processing the message
headers (0 or more)
<blank line>
body (the application data or the XML data; only for a POST)
Here's an example:
POST www;acme.com/purchasing/order.cgi HTTP/1.1
Content-Type: text/xml
Content-Length: 1230
User-Agent: Cern-Line Mode/2.15
Date: 3/27/00

```
<XML>
    <From>intel.com</From>
    <To>bookstore.com</To>
    <PurchaseBook>
        <ISBN>02013798233</ISBN>
        <PurchaseAmount> 98</PurchaseAmount>
    </PurchaseBook>
</XML>
```

In this example, the URL (or request line) is provided in a request line to identify a program or application to process the message. Several header lines (Content-type, Content-length, date, etc.) make up an HTTP header. The application data is provided after the HTTP header, and in this example is provided as XML data. A start tag <XML>, and </XML>, an end tag, identify the start and end, respectively, of the application data (or XML data). This XML application data is also referred to as a XML document. The XML document includes markup characters (or tags) which describe data, and data characters. As an example, a "To" element of the above XML document is written as: <To>bookstore.com</To>. Where <To> is a start Tag and </To> is an end tag, which are markup characters because they describe the XML data characters (bookstore.com). The business transaction information describes the business transaction (To, From, items purchased, purchase amount, quantity, etc.), and is not included in the URL, the HTTP header, or any other header, such as an IP header, TCP header, of the envelope used for sending the message. These are merely examples of the types of business transaction information in a message upon which the director 145 can analyze and make routing or switching decisions for the message.

At block 215 of FIG. 2, the director 145 (FIG. 1) parses all or part of the application data (the XML data in this example) and can check to ensure that the XML document or application data is well formed. For example, the director 145 may check to make sure at least a portion of the XML document meets the so-called well-formedness constraints or requirements in the XML specification or standard. Parsing generally refers to the process of categorizing the characters or XML data that make up the XML document as either markup (e.g., <To>) or character data (e.g., bookstore.com).

At block 220 of FIG. 2, the application data or XML data, including markup characters and/or character data, is then compared to one or more configuration patterns or queries, which may be stored in the director 145, to determine if there is a match. According to an embodiment, the configuration patterns may be dynamically changed or updated by a user or by a program or application. For example, a program may detect the failure of one or more servers and/or detect the response time of servers, and then update the configuration pattern to account for these changes in the network, for example, to redirect certain messages from busy servers to servers which are less busy, or from servers which have failed to the available servers.

At block 225, if there is a match between the content of the application data of a message, which may include the business transaction information which may be provided as XML data, and a configuration pattern or query, then the director 145 directs or switches the message to the corresponding server or processing node in the data center, for example, wherein the message is directed to the specific server as indicated by the configuration pattern. If there are multiple matches, the director 145 can just direct the message based on the first match, or a load balancing policy can be used to balance messages among a group of servers. If there is no match, the message can be directed to a default server or can be blocked. Alternatively, the configuration pattern can also identify a certain pattern for which a message should be blocked from being forwarded. In this respect, the director 145 may also act as a filter to selectively pass or forward some messages while blocking others, based upon the application data.

For example, the director 145 may be configured to direct or switch messages based on the following configuration patterns or queries:

| Server      | IP address | Port | XML pattern         |
|-------------|------------|------|---------------------|
| S1 (e.g., 150) | 10.1.1.1 | 80   | To = bookstore.com  |
| S2 (e.g., 160) | 10.1.1.2 | 80   | To = stockquote.com |
| S3 (e.g., 170) | 10.1.1.3 | 80   | To = computerstore.com |

Based on the above configuration patterns, the director 145 would direct a message to server S1 (having the IP address 10.1.1.1 and port 80) if the data for the To element of the business transaction information is bookstore.com. The message will be directed to server S2 (having an IP address 10.1.1.2 and port 80) if the data for the To element of the business transaction information is stockquote.com. And, the director 145 will direct any messages to server S3 if the data for the To element of the business transaction information is computerstore.com. Director 145 will translate a destination address and port number of the packet to the appropriate destination address and port number (i.e., to the address of the destination server), if necessary.

This advantageously allows different types of services (or different levels of service) to be provided for messages based on the content of the application data, such as the business transaction information, in the message. In this example, server S1 may be allocated to handle purchase orders for books sent to bookstore.com. Server S2 may be allocated to process requests for real-time stock quotes, while server S3 may be allocated to process purchase orders for computers sent to computerstore.com.

There are many examples where content based switching based upon the content of the application data or business transaction information can be used to offer different or differentiated services or even different or differentiated levels of services. As another example, the director 145 may be configured to direct or switch messages based on the following configuration patterns or queries:

| Server      | IP address | Port | XML pattern                       |
|-------------|------------|------|-----------------------------------|
| S1 (e.g., 150) | 10.1.1.1 | 80   | PurchaseAmount < $100             |
| S2 (e.g., 160) | 10.1.1.2 | 80   | $100 < PurchaseAmount < $1000     |
| S3 (e.g., 170) | 10.1.1.3 | 80   | $1000 < PurchaseAmount            |
| S4 (not shown) | 10.1.1.4 | 80   | $1000 < PurchaseAmount            |

In this example, messages for purchase orders are sent to server S1 if the purchase amount is less than $100; messages for purchase orders are sent to S2 if the purchase amount is less than $1000 and more than $100; and for the high dollar purchases, the messages for purchase orders for purchases greater than $1000 can be sent to either of two servers. In this fashion, the director 145 (FIG. 1) can direct or route received messages based on the content of the application data or business transaction information in the message. This allows web sites or electronic-businesses (e-businesses) to offer different or differentiated levels of services based on the content of the application data or transaction information.

In this particular example, two servers (S3 and S4) have been allocated to handle the highest dollar purchase orders. Thus, by specifically allocating greater resources (e.g., two or more servers as compared to just one server) for the higher dollar amount purchases as compared to the lower dollar purchases, an e-business operating at data center 135 can provide a higher level of service for purchase order messages having a higher dollar purchase amount. In this manner, director 145 can switch or direct messages to another network device or to a specific server based upon a wide variety of business transaction information or application data.

II. Validation Acceleration

Figure 3:
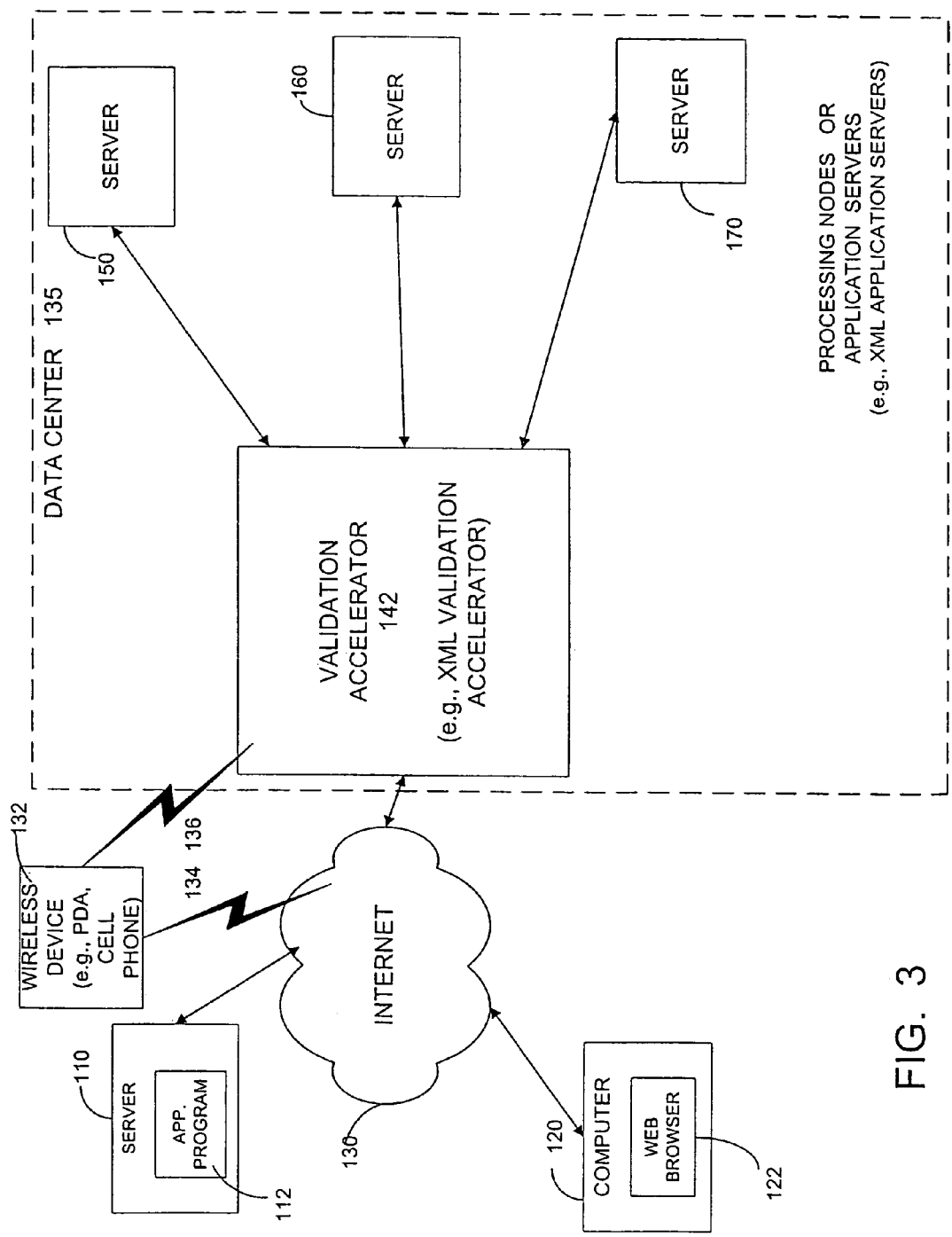
FIG. 3 is a block diagram illustrating a network system including a validation accelerator according to an example embodiment.

FIG. 3 is a block diagram illustrating a network including a validation accelerator 142 according to an example embodiment. According to an advantageous embodiment, the data center 135 also includes a validation accelerator 142 to pre-validate received messages before the messages are sent to one of the application servers or processing nodes. According to an example embodiment, the validation accelerator 142 is provided as a network apparatus. In other words, according to an example embodiment, the validation accelerator 142 can be coupled between a network 130 and a plurality of processing nodes or application servers, such as servers 150, 160 and 170. Providing the validation accelerator 142 as a network apparatus that may be separate from the application servers allows the computationally expensive task of document validation to be off-loaded from the application servers to the validation accelerator 142. Alternatively, a plurality of validation accelerators 142 may be provided, with one validation accelerator 142 being provided for one or more application servers or other processing nodes.

As noted above, an XML document must be checked to ensure it meets the basic syntax and format of XML, for example, to determine whether the document is "well formed". In addition, the XML standard also optionally allows a document to be validated, which is a more rigorous check to determine if the structure or grammar of the XML document complies with structure or grammar required by the particular XML based language. XML allows a document to be validated against a validation template. A validation template defines the grammar and structure of the XML document, including required elements or tags, etc.

There can be many types of validation templates such as a document type definition (DTD) in XML or a schema, as examples. These two validation templates are used as examples to explain some features according to example embodiments. Many other types of validation templates are possible as well. A schema is similar to a DTD because it defines the grammar and structure which the document must conform to be valid. However, a schema can be more specific than a DTD because it also includes the ability to define data types, such as characters, numbers, integers, floating point, or custom data types, etc. In addition, unlike a DTD (under present standards), a schema may be required to be well formed. Thus, both the application data and the schema can both be parsed and checked for basic syntax or well-formedness. Therefore, at least for some applications, it is expected that schemas will possibly become more common than DTDs in the future.

As noted above, validating a received document against a validation template is optional according to the XML standard. If a document is to be validated against a particular validation template, the XML document will include validation instructions (or validation code) at the beginning of the document. One example of validation instructions can be a document type declaration, as commonly known in XML. Another example is a schema or a reference to an external schema. According to current XML, the validation instructions, such as document type declaration or schemas, etc. are an optional area of the document that declares the structure, element types, attributes, etc. of the validation template. To be a valid document, the structure and grammar of the application data in the document must match the structure and grammar defined by the validation template, for example, if validation instructions are included in the document. The validation template can be provided internal to (or within) the document and/or external to the document.

Figure 4:
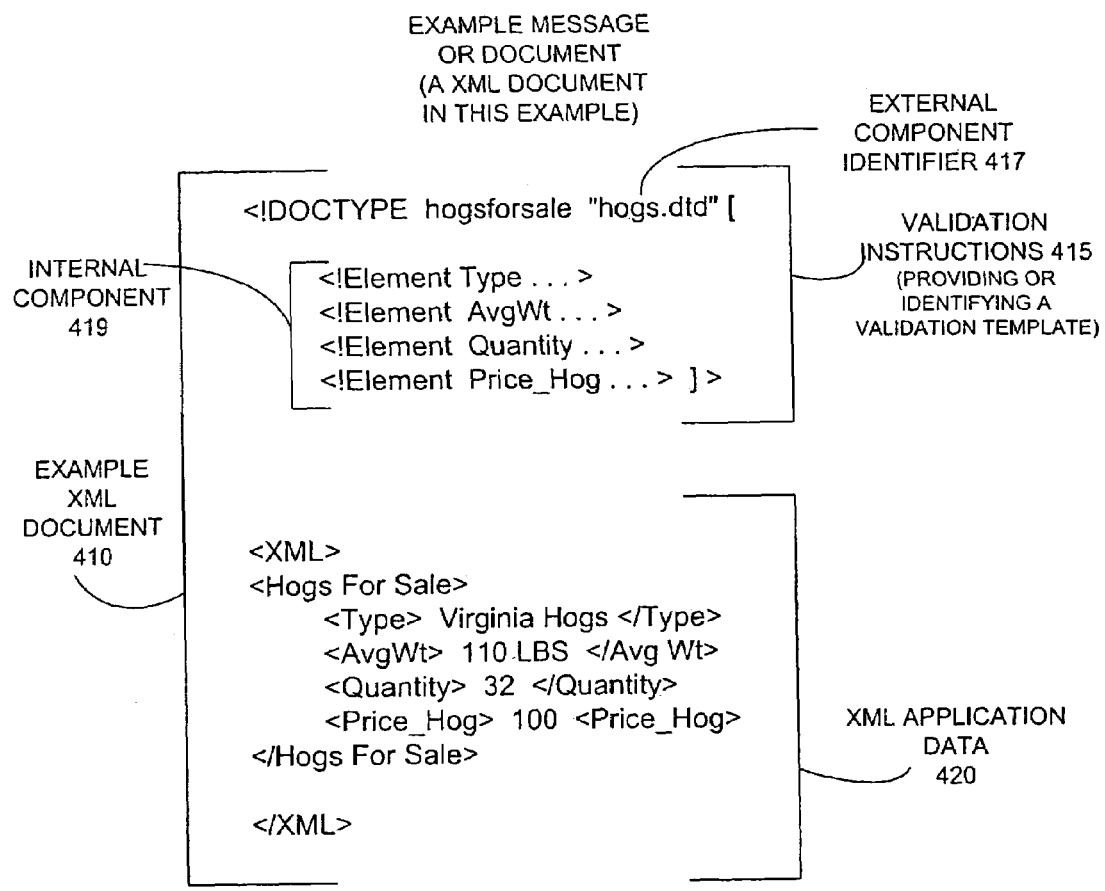
FIG. 4 is a diagram illustrating an example message according to an example embodiment.

FIG. 4 is a diagram illustrating an example message according to an example embodiment. The example message shown in FIG. 4 includes an XML document 410. XML document 410 includes XML application data 420, for example, including business transaction information, and validation instructions 415.

The application data 420 is the application data that will be processed by an application server. The application data 420 may include, for example, business transaction information, such as a list items to be purchased, prices, quantities or other specific details of a transaction or a request for information, such as a request for stock quote, transaction details, etc.

According to an embodiment, the presence of one or more validation instructions 415 indicates that the document may be validated before processing the application data 420 based on a validation template provided within and/or identified by the validation instructions 415. In other words, according to an embodiment, the presence of validation instructions may indicate that the application data should be pre-validated at a network apparatus (such as validation accelerator 142, also referred to as a validator) before passing the data to an application server for further processing. To indicate to the application server that the document or the application data has been validated, the validation instructions may be removed from the document and/or an indication, such as a comment or instruction in the data or a field set in the message, may be provided to indicate that the application data or message has been validated (i.e., pre-validated). According to current XML, document validation is optional, for example, by the application server, even when validation instructions 415 are present. However, it is possible that in the future, validation in XML or other languages may be required.

If the document should be associated with a validation template, such as a document type definition, schema, etc., for document validation, the document may typically include one or more validation instructions 415. The validation instructions 415 provide or identify the validation template or document type definition which defines the document structure and grammar, for example, elements, attributes, etc., to which the application data 420 of document 410 must conform. The validation template can include an internal component and/or an external component.

In this example shown, the validation instructions 415 or validation template are provided as a document type declaration. The validation instructions 415 begin with the DOCTYPE statement "<DOCTYPE hogsforsale . . . " which indicates that there is a validation template, which may be provided within the document, for example, as internal component 419, or provided external to the document, such as an external component identified as "hogs.dtd" 417 in this example. Therefore, in this example, the validation instructions 415 provide an internal component 419 of a validation template and an external component identifier 417 identifying an external component. The internal component 419 and the external component (not shown) together form the validation template for this document for validating the application data 420 for document 410. According to an embodiment, if validation is being performed, the presence of the DOCTYPE statement or other validation instructions typically will cause an application or application server to validate the application data 420 in the message against the validation template.

The internal component 419 of the validation template defines that a valid hogsforsale document must include the following elements: type, avg wt, quantity and price/hog, etc. This is just an example.

In this example, the identifier "hogs.dtd" identifies an external entity or file which is an external component of the validation template. The external component can be located on a remote server or other location based on the external component identifier 417. The external component of the validation template (identified as "hogs.dtd") may include additional requirements on the structure or grammar of the application data 420 of the document 410. The external component identifier 417 may be provided as the complete address, or as a relative address or pointer, for example, relative to the address or location of the source or originating node of the message. For example, the "hogs.dtd" identifier listed in the validation instructions 415 may actually reference the "hogs.dtd" external component 417 which may be found at, for example: oasis.xml.org/farming/livestock/hogs.dtd. As noted above, examples of validation templates include a Document Type Definition for XML, a schema, etc.

In addition to removing the validating instructions (or instead of removing the validating instructions) an indication can be added to the message indicating to the application server that the application data or message has already been validated (i.e., pre-validated). This pre-validation indication can be provided, for example, as a field in the message, as an instruction or comment in the application data itself, or using another technique. For example, In the XML specification, besides element tags, and data, there is something known as a processing instruction tag which allows information specific to an application to be embedded in an XML document. Processing instructions are not considered to be part of the character data content of an XML document, but they are always passed on to the XML application by the parser. The format is <? . . . ?> for the processing instruction tag. Thus, according to one embodiment, after the validation instructions (or the DTD or schema or reference thereto) has been removed, the following comment or instruction tag could be added near the beginning of the document (or other location): <? validated by intel?>.

Alternatively, a different destination address or port number can be used in the packet header to indicate that the XML message in the packet has been pre-validated. For example, instead of port 80, port 87 can be used as the destination port to indicate a pre-validated message for an XML document. These are just some example techniques that can be used to indicate to the server that the XML document has been already validated, or need not be re-validated.

By pre-validating the document and then removing the validation instructions from the document, and/or adding a pre-validation indication to the document or message, the expensive step of validation is off-loaded from the application server to a network apparatus, network appliance or other system, which may be referred to, for example, as the validation accelerator 142.

III. Transformation

Figure 5:
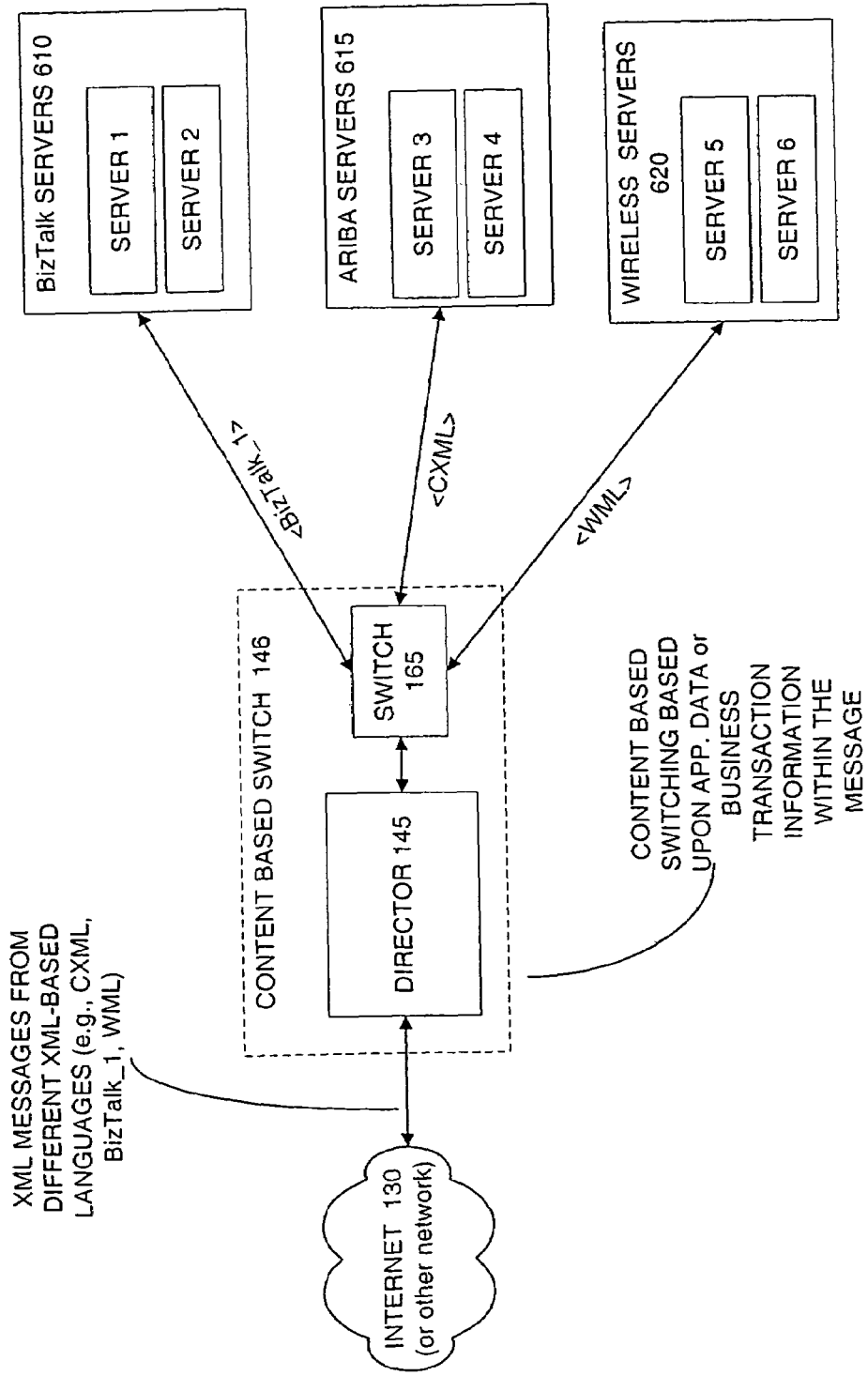
FIG. 5 is a block diagram illustrating another example operating environment for a content based message director according to an example embodiment.

FIG. 5 is a block diagram illustrating another example operating environment for a content based message director 145 according to an example embodiment. Message director 145 and switch 165 together may be considered as a content-based switch 146.

According to an advantageous aspect of the present invention, switch 146 can receive an XML message, compare the application data or business transaction information to a specific configuration pattern, and then switch the message to an appropriate processing node or server regardless of the type of XML-based language used by the message. Once the message director 145 of switch 146 is configured to detect or recognize one or more specific tags and corresponding data (for example, PurchaseAmount >$100), the content based switch 146 can direct or route or switch the message based on the content of the application data, for example, based on the business transaction information provided as XML data, regardless of the type of XML-based language that is used by the message.

As shown in FIG. 5, there are three sets of servers coupled to the switch 165, including: a set of BizTalk servers 610 (including servers 1 and 2) which communicate data using an XML based language known as BizTalk; a set of Ariba servers 615 (including servers 3 and 4) which communicate data using the XML based language known as CXML; and a set of wireless servers 620 (including servers 5 and 6) which communicate data using only the XML based language known as Wireless Markup Language or WML. These are merely provided as examples.

Messages can arrive at switch 146 in a variety of different data formats including Electronic Data Interchange (EDI), a flat alpha-numeric file format, one or more XML languages or formats (such as WML, CXML, BizTalk, eBXML, etc.), HTML, etc. Certain client computers may be able to communicate using one type of data format (or very few types of formats), while application servers (such as servers 610, 615, 620) each may communicate using a different type of data format.

Figure 6:
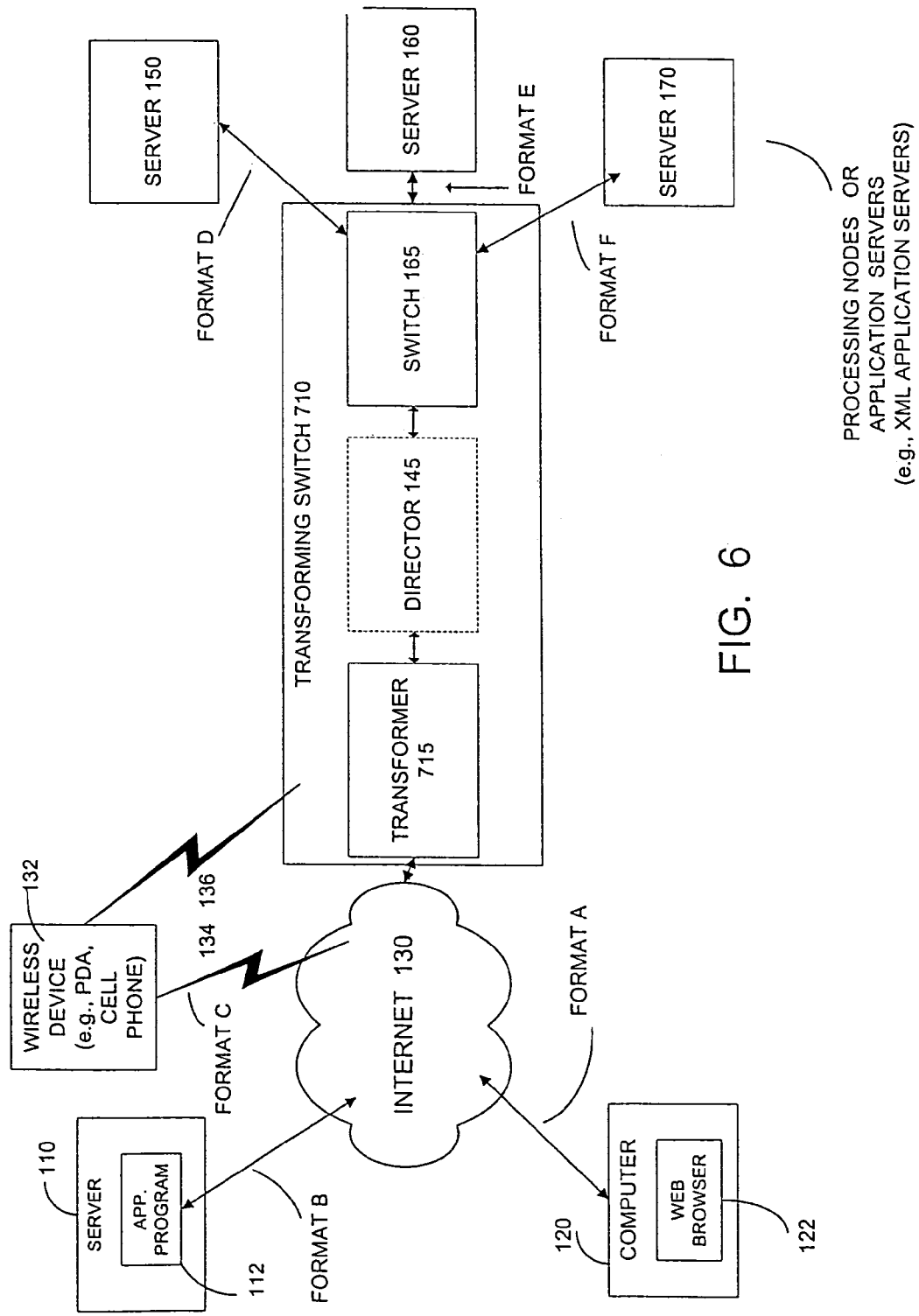
FIG. 6 is a block diagram illustrating a transforming switch according to an example embodiment.

FIG. 6 is a block diagram illustrating a transforming switch according to an example embodiment. Transforming switch 710 includes a transformer 715 to transform or translate at least a portion of a message from a first data format to a second data format or to a selected one of a plurality of second formats. Message Director 145, which may be optional in some embodiments, is coupled to the output of transformer 715. Message director 145 directs or switches messages to a selected server based upon the content of application data, such as business transaction information, which may be provided as XML data or data in another format. According to an example embodiment, message director 145 may output a switching decision to switch 165 based on the business transaction information of the message as compared to a pattern (or one or more patterns), as described above. Switch 165 then switches the transformed message to one of a plurality of output ports or to one of a plurality of servers (such as servers 150, 160 and 170) based on the decision or instructions from message director 145. Because content based message director 145 may be optional in some instances, switch 165 may switch the transformed message using address-based routing or switching techniques, such as switching to a particular output port of switch 165 based on source and/or destination address and port numbers provided in the message or provided in a header of a packet carrying the message.

Transformer 715 can transform messages between a variety of different data formats, as required. An example communication may include a request followed by a response, although the invention is not limited in this respect. For example, a first node may issue a request over network or Internet 130 that is received by a second node. The second node may send a response back to the first node. Both the request and response may typically be routed over the Internet or network 130 and transforming switch 710. The request and the response may both include data that may need to be transformed. The transforming switch receives the message, provided in one or more packets, determines if the data within the packet(s) needs to be transformed, performs any transformation that is required, and then forward the message via one or more packets.

There are four general cases involving transformations: A transform may be performed on just data in the request, on just data in the response, on data in the request and in the response, and in neither. This last case involves messages having data, if any, that is already in a format that is compatible with the receiving node, and thus, no transformation is necessary.

For example, web browser 122 of computer 120 may issue a request for a stock quote using a HTTP "Get" message, and be able to process data only in format A. The request may be sent via network 130 and switch 710 to server 150 without transformation, for example, because both server 150 and browser 122 are compatible with HTTP messages. Server 150 then issues the response having data (the stock quote) in format D. The data in format D may be placed in another HTTP message. While both browser 122 and server 150 are HTTP compatible, server 150 processes data in format D while browser 122 processes data in format A. Thus, transformer 715 within switch 710 would then transform the data in the response from format D to data format A and then forwards the response back to the web browser 122 over network 130.

In another example, in a business-to-business (B2B) transaction, server 150 obtains a blank invoice from server 110 via Internet or network 130 and switch 710. A software program on server 150 fills out or completes the received invoice and returns the completed invoice. The switch 710 receives the completed invoice from server 110 in format A in one or more packets, transforms the invoice from format A to format D, and then outputs the completed invoice to server 150 in format D, for example via one or more packets sent over Internet or network 130.

According to an example embodiment, switch 710 may establish a connection with a first node and then receive a message, including application data, etc. from the first node via one or more packets over the first connection. Switch 710 then performs any required transformation on the message, if any, and then establishes a second connection between the switch 710 and a second node. The transformed message is then switched or output as one or more packets over the second connection to the second node. Thus, the transforming switch 710 may operate as a network apparatus to receive or intercept messages, perform any format transformation on a portion of the message if required, and then switch or forward the message via one or more packets to a destination processing node. In many cases, the presence of the transforming switch and the fact that the data or message may be transformed in one or both directions may be transparent to one or both processing nodes.

Figure 7:
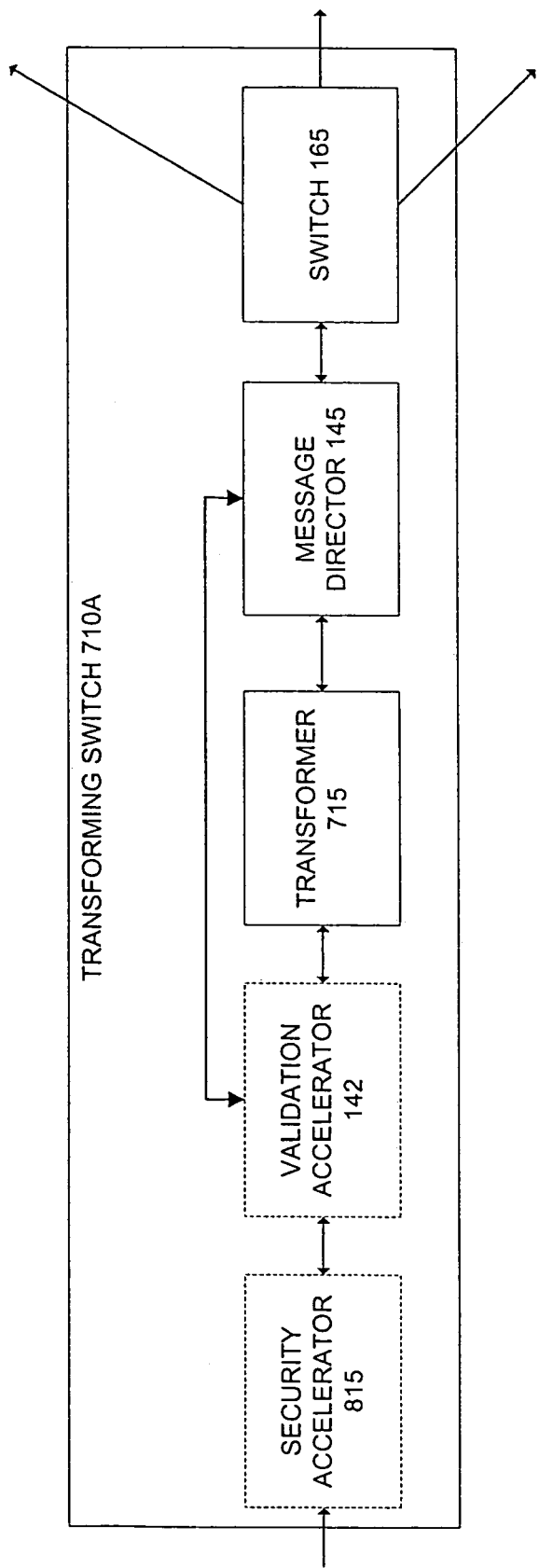
FIG. 7 is a block diagram illustrating a transforming switch according to another example embodiment.

FIG. 7 is a block diagram illustrating a transforming switch according to another example embodiment. Transforming switch 710A is similar to the transforming switch 710 shown in FIG. 6, as it includes a transformer 715, a message director 145 and a switch 165. The transforming switch 710A may further include two additional elements, including a security accelerator 815 and/or a validation accelerator 142.

As described above, the validation accelerator 142 validates at least a portion of the message (e.g., validates the application data 420, FIG. 4) by comparing the structure and grammar of the application data 420 to the structure and grammar defined or required by the validation template. If the document or message is valid, the validation accelerator 142 then optionally removes the validation instructions, including any statements that might cause the document to be validated (e.g., a DOCTYPE statement), any internal component(s) of the validation template and any references or identifiers to external components of the validation template. In addition, validation accelerator 142 may add to the message an indication indicating that the application data or message has already been validated (i.e., pre-validated). In the event that the validation instructions, such as a validation template or a reference to an external validation template, are removed from the document, the validation accelerator 142 should pass the validation instructions to the transformer 715, for example, to be used to identify the correct transformation template. Rather than stripping out or removing the validation instructions, the validation instructions may be left in the message to be used to perform the transformation or to determine whether a transform is required and to identify the type of transform that should be performed. The switch 710 may also add to the message an indication that the message has been transformed or an indication that the message has been transformed and validated, so as to inform a processing node that receives the message that these functions, transformation and validation, have already been performed and need not be repeated.

Therefore, as shown in the example embodiment of FIG. 7, validation accelerator 142 validates the message or document before it is transformed. This ensures that the message has the correct format and grammar before transforming the message. In addition (or in the alternative), validation accelerator 142 may validate the message after it has been transformed to the new data format. (e.g., the validation accelerator 142 may receive a copy of the transformed message from message director 145, validate it and then notify the director 145 of its validity before the director 145 outputs the message to switch 165 for switching). The post-transformation message validation ensures that no errors occurred during the transformation. The second validation is not necessary. Validation can be performed before transformation, after transformation, both before and after transformation, or not at all.

Security accelerator 815 encrypts outgoing messages and/or decrypts incoming messages received from the network 130. According to an embodiment, the security accelerator 815 may be a Secure Sockets Layer (SSL) accelerator. The security accelerator 815 allows the security related tasks such as encryption and/or decryption to be off-loaded from the application server to the accelerator 815. Security accelerator 815 is optional.

IV. Cascading Network Apparatus

Figure 8:
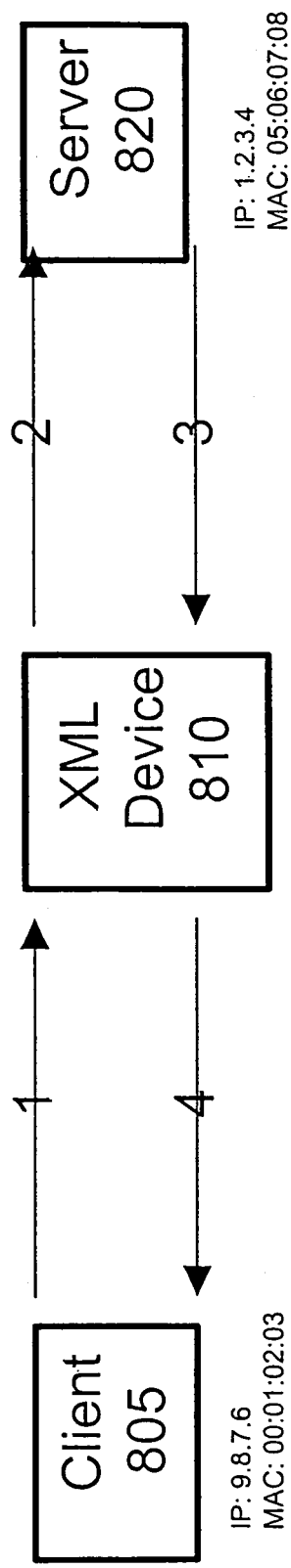
FIG. 8 is a block diagram illustrating a system according to an example embodiment.

FIG. 8 is a block diagram illustrating a system according to an example embodiment. An XML device 810 is coupled between a client 805 and a server 820. The client 805 may be a processing node that requests access to a resource provided on server 820, for example. The client 805 typically initiates a connection request, while the server 820 is typically the target or destination for the connection request. The device 810 may be, for example, a validation accelerator (or validator) 142 to perform validation, a transformer 715 to transform the data or message from a first data format to a second data format, or a switch 146 to switch the data or message to a particular output port or processing node if the business transaction information or other fields in the message or data matches a predetermine pattern or value. The device 810 may also be a combination or a multiplicity of these functions or devices. For example, device 810 may include a validator, a transformer and a switch.

The device 810 is placed in-line with an existing server 820 such that packets or traffic from client 805 directed to server 820 and from server 820 to client 805, typically should first pass through the device 810 before reaching the destination. According to an example embodiment, when properly configured, the device 810 will typically pass traffic through from client 805 to the server 820 it is in-line with, without any alteration to the data, with the exception of data or messages the device 810 that match the configuration of device 810. The configured parameters for device 810 may include, for example, an Internet Protocol (IP) address, and a port number for which the device 810 may detect connection requests and then establish connections.

When data flowing through the device 810 matches its configured parameters, device 810 will typically store the information locally, rather than passing it through to the server 820, and then perform an operation on it, typically an XML related operation. The XML related operation may be, for example, XML validation, transforming or content based switching (such as XML based switching), as noted above. After the XML operation is performed, the data will be forwarded onto the original server (in the case of XML validation or transforming), or to another selected server that matches a predetermined pattern in the case of XML switching. The processed data that is forwarded on will appear to have come from the original client 805, although the contents of the data or message, may be altered from the original message depending upon the configuration of the device and the XML operation performed.

Connections from a client 805 to a server 820 are passed through the XML Device 810 by placing the XML device 810 on the network, physically between the client 805 and server 820. The XML device 810 may spoof physical addresses or MAC (Medium Access Control) addresses, and typically has no IP address of it's own, so that it may be transparent at Layer 2 and above. The XML device 810 includes a configuration, such as a specific IP address and port number. The XML device does not typically have its own IP address. Rather, each XML device 810 is mapped to an IP address and port number where the device will accept connection requests in order to receive messages or data. The IP address and port number to which the XML device 810 has been mapped will be referred to as the device's configuration. The device's configuration may alternatively be defined by other values or fields as well. In some cases, the XML device 810 may be configured to accept messages directed to one or more servers or processing nodes behind it.

The device's spoofing of MAC addresses will be briefly explained. Client 805 issues an address resolution protocol (ARP) message, that requests a MAC address corresponding to the server's IP address (IP 1.2.3.4), arrow 1 in FIG. 8. Device 810 then forwards the ARP message to server 820, arrow 2. The server 820 responds with its MAC address (MAC 05:06:07:08), arrow 3. The XML device 810 then forwards the reply to client 805, providing the MAC address of the server 820, arrow 4 in FIG. 8. Performing an ARP for the server's MAC address would usually get no response since the server 820 and client do not reside on the same network segment or link. The XML device 810, however, will respond to an ARP by the client with the Server's MAC address, thereby appearing to the client 805 to be the server 820. Similarly, the XML device 810 will respond with the client's MAC address when the server 820 performs an ARP for the client. The XML device 810 may thus be invisible to other devices on the network.

According to the example embodiment shown in FIG. 8, the XML device 810 receives all network traffic passing between the client 805 and server 820, and compares the destination IP address and destination port number of new connection attempts (also known as synchronization or SYN packets) against its configuration. If a packet is not a new connection attempt, or does not match the XML device's configuration, it may be forwarded on to the server 820, with typically no (or little if any) changes (including MAC changes). If a packet is a new connection attempt, and matches the XML device's configuration (such as IP address and port number), the XML Device will itself accept information from the Client (rather than forwarding the packets onto the Server). The device's configuration may include a wide variety of fields or parameters, such as IP address, port number, or a specific value provided in another field of a packet, such as an IP option or other field provided in a header or packet. The IP address and port number are merely examples, but the device configuration is not limited thereto.

When the client 805 has completed sending it's request to the XML device (which it believes to be the server 820), the XML device 810 will perform an operation on the data. The operation may be XML validation or XML transforming, or XML switching. If the XML operation was not performed, then the data which was accepted from the client 805 will be sent onto the server 820 without processing. There may be several reasons why the operation was not performed, such as: the packet or message did not match the device's configuration, the device did not have available resources to perform the operation, a transformation template was not available to perform the transformation, the message or data was not valid (or could not be validated), or the message or data did not match a predetermined pattern for switching.

If an XML operation was performed, the XML device 810 will send the (possibly modified) XML content onto the server 820. The server that receives this XML content may be the same server as the original target server 820, the same server (for example, having the same IP address) but with a different port number, or an entirely different server.

Figure 9:
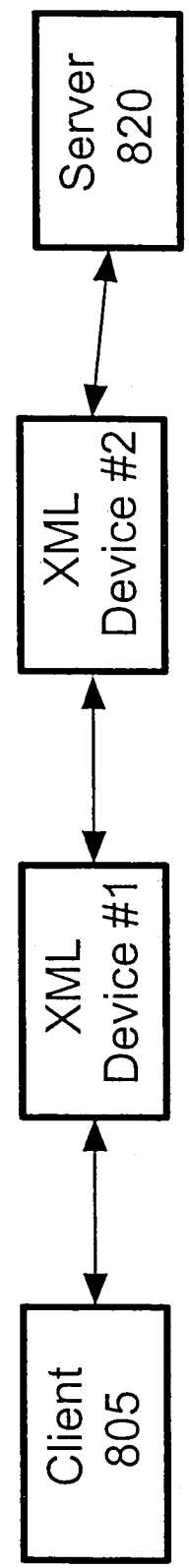
FIG. 9 is a block diagram illustrating cascading of two devices according to an example embodiment.

FIG. 9 is a block diagram illustrating cascading of two devices according to an example embodiment. The possible alteration of the destination IP address or destination port number in messages or packets allows multiple XML devices to be cascaded or coupled together in series. According to one embodiment, both XML devices could have the same configuration. In such case, the first XML device (device #1) may perform a transaction on the message or data, change the destination IP address or port number for the message or data, and then forward the post-operation message to the second XML device (device #2). Because the destination port or IP address has been changed by the first XML device, however, it no longer matches the configuration of the second XML device, which in this example, is configured the same as the first. Because a device may operate on the message (or group of packets) only if it matches the configuration of the XML device, the second device will forward the message or packets without operation on to server 820. Thus, the data is forwarded transparently through XML Device number 2 onto the server 820. This mechanism allows for an arbitrary number of XML devices to be cascaded or connected in series.

This allows scalability of XML processing in the network. For example, multiple validators can be coupled in series, each having the same configuration. This allows the validation load to be spread across multiple devices. Similarly, multiple transformers or multiple content based switches may also be coupled in series to provide capacity to handle an increased number of messages or transactions.

For example, if one device receives a message, but is busy or does not have sufficient resources to process or operate on the message, or if the device is malfunctioning, the device may then forward the message without processing it on to the next device in the series or chain of devices. A failed XML device may typically forward received packets or messages to the next device without processing the messages in the event of failure. For example, in case the first XML device in the chain fails, it may utilize an internal relay to physically become a length of Ethernet cable or the like, and packets will transparently pass through it, onto the second XML device. This allows for fault tolerance of XML processing. XML processing abilities may be scaled simply by adding in additional XML Devices. The failure of any XML device does not have a catastrophic impact on XML processing abilities because additional XML devices which are cascaded will process the transactions.

Below is pseudocode that describes operation of an XML device according to an example embodiment.

```
If ((Packet == SYN packet) && (Destination IP and Port == Configured
Destination and Port) && (Resources > Minimum Required))
{
    Do XML Processing( )
}
else if (Packet == ARP Request)
{
    Forward packet onto Server and remember response (MAC/IP
correspondence for server)
}
else
{
    Forward packet onto Server
}
The XML Processing takes place according to the following process:
Do XML Processing
{
    Collect XML Data from Client (for example, receive all packets for
message)
        Perform XML Operation
        if (XML Operation Successful)
        {
            Send resultant XML Data to Server with new
IP Address and/or Port using Client MAC Address
        }
        else (XML operation is not successful)
        {
            Send original XML Data to Server with original IP Address
and Port using Client MAC Address
        }
}
```

Figure 10:
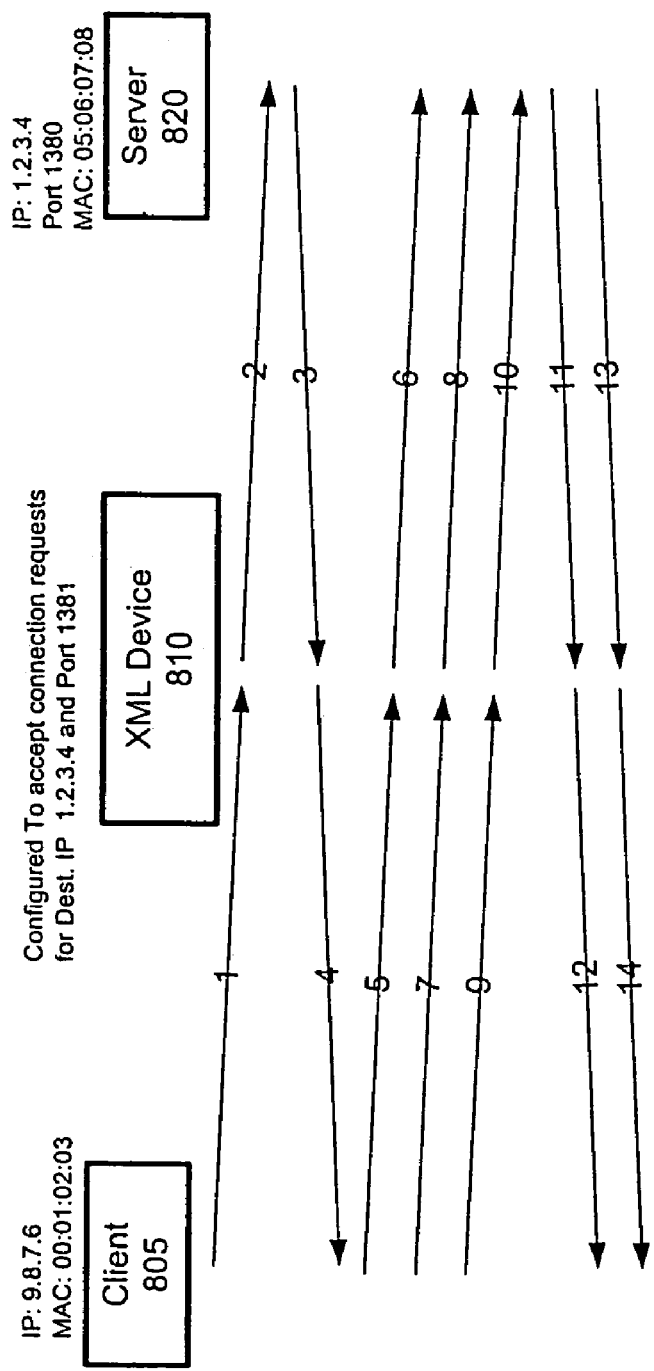
FIG. 10 is a diagram illustrating operation of an XML device to process a transaction or message that does not match the configuration of the XML device.

FIG. 10 is a diagram illustrating operation of an XML device to process a transaction or message that does not match the configuration of the XML device. The numbers 1–14 below correspond to the numbers on each arrow of the diagram shown in FIG. 10.

1. Client initiates connection/socket to server by sending a SYN packet (a synchronization request packet that requests a connection between client and server).
   Source IP/MAC: 9.8.7.6/00:01:02:03
   Destination IP/MAC: 1.2.3.4/05:06:07:08
   Destination Port: 1380
2. XML Device receives the SYN packet and compares the fields (destination IP address and port number) to the configuration of the XML device. The XML device determines that SYN packet Destination Port does not match the device's configuration, so it forwards on the packet to the Server, without modifying the packet.
   Source IP/MAC: 9.8.7.6/00:01:02:03
   Destination IP/MAC: 1.2.3.4/05:06:07:08
   Destination Port: 1380
3. Server sends SYN-ACK (an acknowledgement of the Syn packet) back to the client.
   Source IP/MAC: 1.2.3.4/05:06:07:08
   Destination IP/MAC: 9.8.7.6/00:01:02:03
4. XML device is not handling this connection, so it forwards packet back to the client.
   Source IP/MAC: 1.2.3.4/05:06:07:08
   Destination IP/MAC: 9.8.7.6/00:01:02:03
5. Client sends ACK packet to complete opening of socket.
   Source IP/MAC: 9.8.7.6/00:01:02:03
   Destination IP/MAC: 1.2.3.4/05:06:07:08
   Destination Port: 1380
6. XML device notices packet is not a SYN packet, and forwards packet to server.
   Source IP/MAC: 9.8.7.6/00:01:02:03
   Destination IP/MAC: 1.2.3.4/05:06:07:08
   Destination Port: 1380

Arrows 7 through 14 in FIG. 10 follow a similar procedure. Because no subsequent packets are connection request packets (such as SYN packets), the XML device simply forwards packets between the Client and Server. Arrows 7–10 refer to sending data from client to server via the device 810, while arrows 11–12 illustrate sending data from server to client via the device 810. Arrows 13 and 14 refer to closing the connection.

Figure 11:
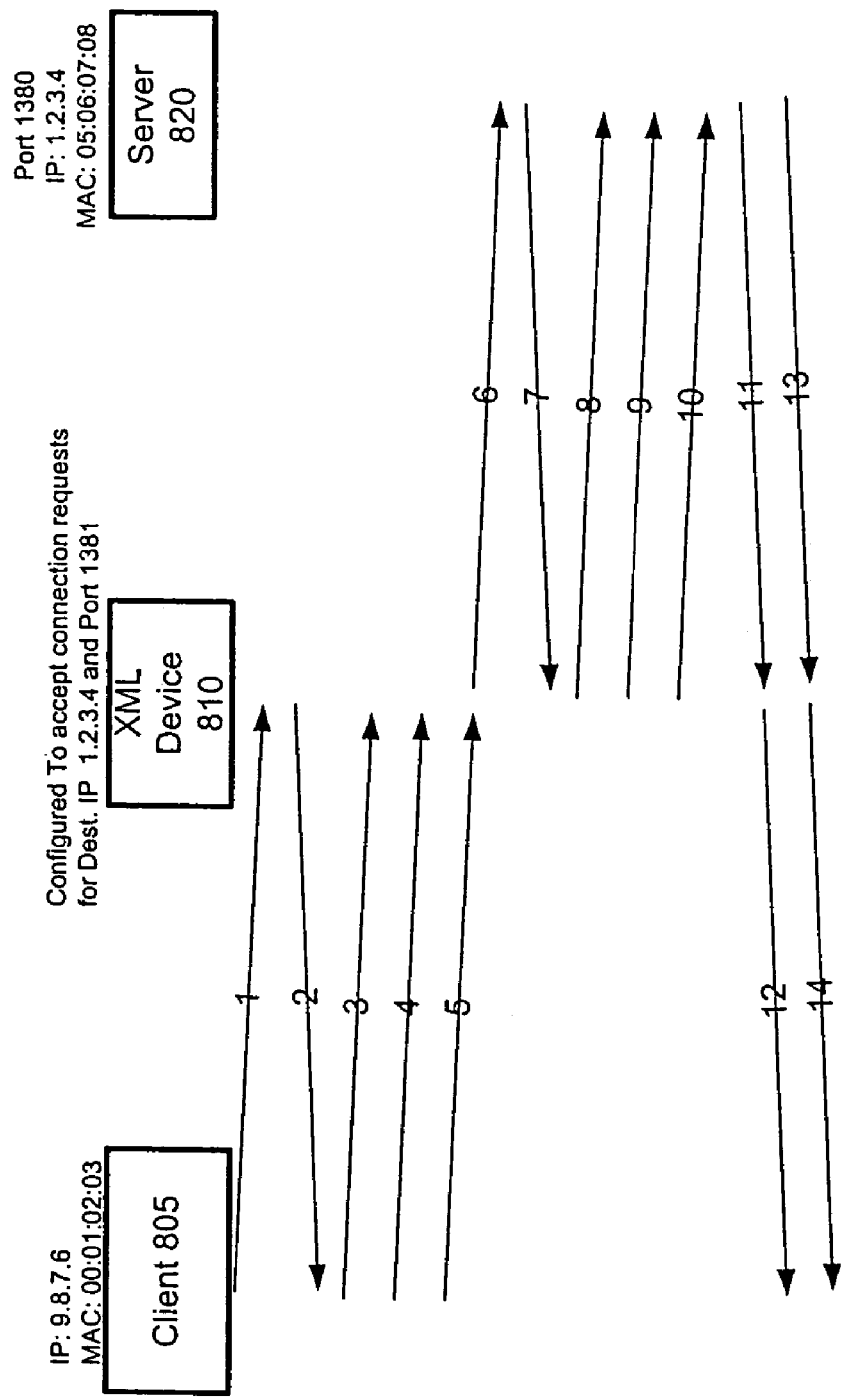
FIG. 11 is a diagram illustrating operation of an XML device to process a transaction or message that matches the configuration of the XML device.

FIG. 11 is a diagram illustrating operation of an XML device to process a transaction or message that matches the configuration of the XML device.

1. Client initiates connection to server by sending a SYN packet.
   Source IP/MAC: 9.8.7.6/00:01:02:03
   Destination IP/MAC: 1.2.3.4/05:06:07:08
   Destination Port: 1381
2. XML Device determines Destination IP address and Port number of SYN packet matches the device's configuration, and sends SYN-ACK back to Client.
   Source IP/MAC: 1.2.3.4/05:06:07:08
   Destination IP/MAC: 9.8.7.6/00:01:02:03
3. Client sends ACK (acknowledgement) packet to complete opening of connection/socket.
   Source IP/MAC: 9.8.7.6/00:01:02:03
   Destination IP/MAC: 1.2.3.4/05:06:07:08
   Destination Port: 1381

4. Client begins sending XML data to XML device posing as server.
   Source IP/MAC: 9.8.7.6/00:01:02:03
   Destination IP/MAC: 1.2.3.4/05:06:07:08
   Destination Port: 1381
5. Client sends remaining XML data to XML device posing as the server.
   Source IP/MAC: 9.8.7.6/00:01:02:03
   Destination IP/MAC: 1.2.3.4/05:06:07:08
   Destination Port: 1381
6. XML Device performs XML Operation (XML Validation or XML Transforming, for example), and then sends SYN packet to the server on new destination port number, posing as the client, to request a connection between XML device and server.
   Source IP/MAC: 9.8.7.6/00:01:02:03
   Destination IP/MAC: 1.2.3.4/05:06:07:08
   Destination Port: 1380
7. Server sends SYN-ACK (acknowledgement) back to XML device posing as client.
   Source IP/MAC: 1.2.3.4/05:06:07:08
   Destination IP/MAC: 9.8.7.6/00:01:02:03
8. XML device sends ACK packet to complete opening of connection/socket.
   Source IP/MAC: 9.8.7.6/00:01:02:03
   Destination IP/MAC: 1.2.3.4/05:06:07:08
   Destination Port: 1380
9. XML Device begins sending XML data to the server posing as the client.
   Source IP/MAC: 9.8.7.6/00:01:02:03
   Destination IP/MAC: 1.2.3.4/05:06:07:08
   Destination Port: 1380
10. XML device sends remaining XML data to server posing as client.
    Source IP/MAC: 9.8.7.6/00:01:02:03
    Destination IP/MAC: 1.2.3.4/05:06:07:08
    Destination Port: 1380
11. Server sends response to XML data input to XML device.
    Source IP/MAC: 1.2.3.4/05:06:07:08
    Destination IP/MAC: 9.8.7.6/00:01:02:03
12. XML device uses data sent by server to send response to client (the XML device may perform another operation on the response data, such as validation, transforming or XML switching of the response data as well)
    Source IP/MAC: 9.8.7.6/00:01:02:03
    Destination IP/MAC: 1.2.3.4/05:06:07:08

Packets 13 and 14 follow the same pattern as 11 and 12, but for the closing of the TCP connections.

If additional XML Devices were placed between the XML Device and the Server, data processed by the first XML Device would pass through the subsequent XML Devices as described above.

For some operations, such as content based switching for instance, it may not be necessary for the device to receive the entire message for the operation to be performed. The XML device may queue a portion of the message, sufficient to make a switching determination, and then the remaining packets may be forwarded and switched to the appropriate processing node by changing their IP address and/or port number.

Figure 12:
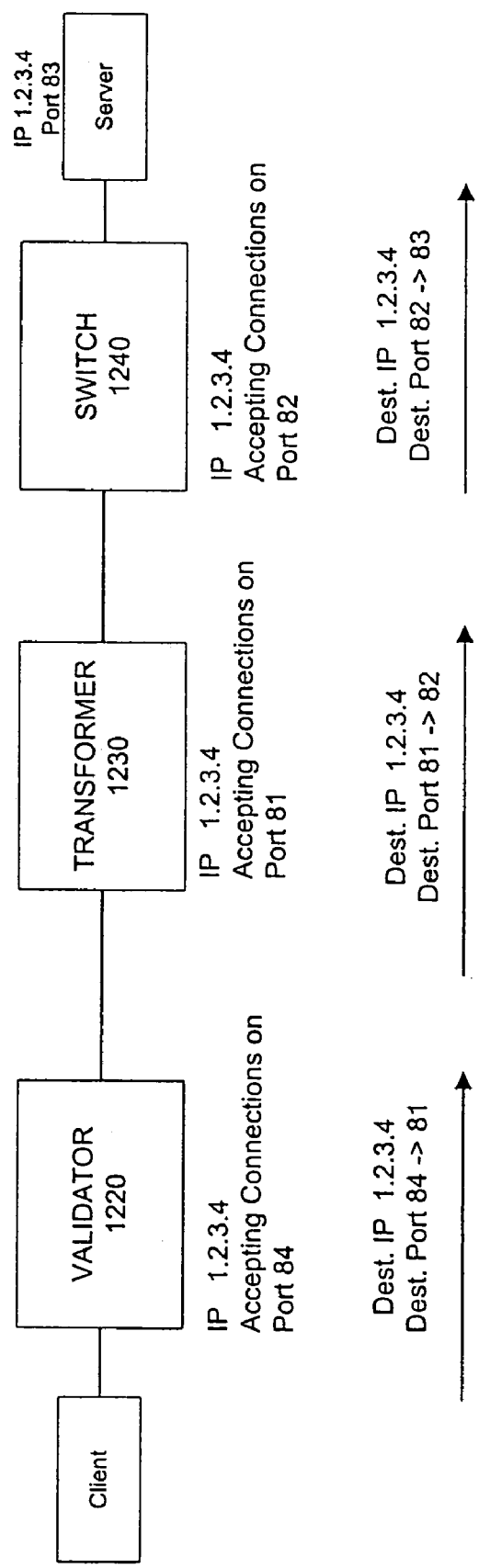
FIG. 12 is a diagram illustrating a cascading of multiple devices according to an example embodiment.

FIG. 12 is a diagram illustrating a cascading of multiple devices according to an example embodiment. In the example embodiment shown in FIG. 12, a validator 1220 (such as a validation accelerator), a transformer 1230 (such as transformer 715) and a switch 1240 (such as content based switch 146) are cascaded together (coupled together serially). A client (or other processing node) is coupled to the validator 1220, while a server (or other processing node) is coupled to switch 1240. Validator 1220 is configured with IP address 1.2.3.4, and to grant or accept incoming connection requests received on port number 84. Transformer 1230 is configured with IP address 1.2.3.4 and to grant or accept incoming connection requests received on port number 81. Switch is configured with IP address 1.2.3.4 and to grant or accept incoming connection requests received on port number 82.

In operation of the system of FIG. 12, a SYN packet is received by validator 1220 from client (requesting a connection), having a destination IP address of 1.2.3.4, and a destination port number of 84. Thus, the packet or message includes parameters or fields that match a configuration of the validator 1220. Therefore, the validator 1220 establishes the requested connection and receives the data or message. The validator 1220 may then retrieve a validation template, or the validation template may be provided within the message. The message is then validated.

The validator 1220 then sends a SYN packet to transformer 1230, specifying a destination IP address of 1.2.3.4, and a destination port number of 81, which match the configuration of transformer 1230. The destination port number of 81 is used to indicate that the validation function has been performed. Because the SYN packet matches the configuration of transformer 1230, transformer 1230 accepts or establishes the requested connection to receive the validated message. Transformer 1230 then may retrieve a transformation template that specifies how the message should be transformed from a first format to a second format. Transformer 1230 then transforms the validated message from a first format to a second format.

Transformer 1230 then sends a SYN packet to switch 1240. The SYN packet includes a destination IP address of 1.2.3.4 and a destination port number of 82, which matches the configuration of switch 1240. The destination port number 82 is used by transformer 1230 to indicate that the transformation operation has been performed on the message. Because the packet or message matches the configuration of the switch 1240, switch 1240 accepts or establishes the requested connection to receive the validated and transformed message. Switch 1240 then performs content based switching on the received message. For example, switch 1240 may switch or output the message to a physical output port or to a processing node or server if a portion of the message matches a predetermined pattern or value (for example, if "Price" is greater than $1000). If there is no match found between the message and the one or more predetermined patterns or values, the message is forwarded to its originally specified server or processing node, as described above for content based switching. The switch 1240 outputs the message by using destination port 83, which may indicate that the message has been switched.

Figure 13:
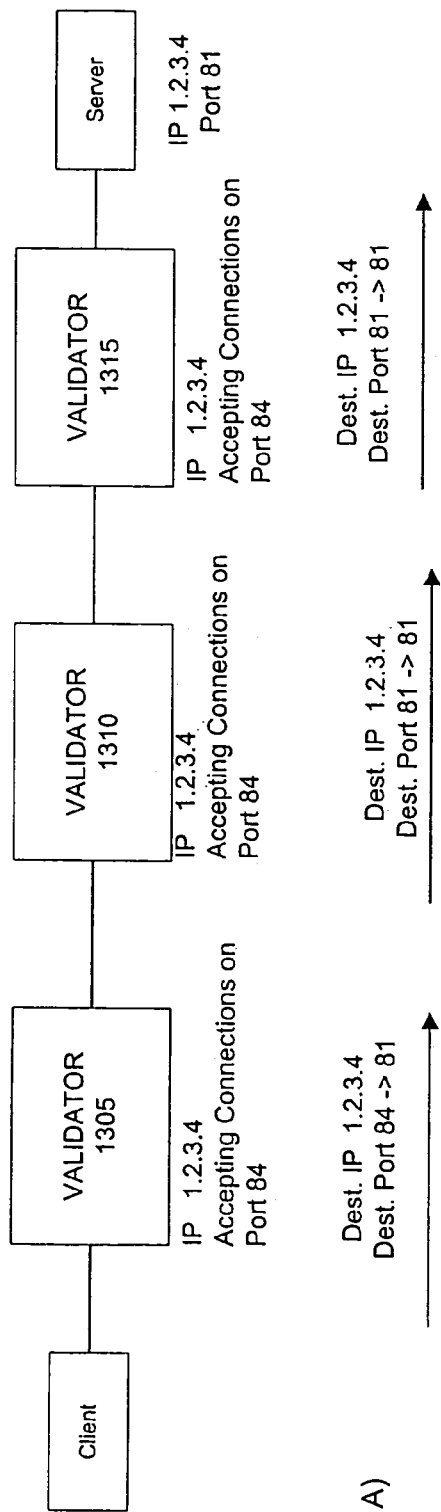
FIG. 13 is a diagram illustrating a cascading of multiple validators according to an example embodiment.

FIG. 13 is a diagram illustrating a cascading of multiple validators according to an example embodiment. Referring to FIG. 13, three validators are cascaded (or coupled serially) together, including validators 1305, 1310 and 1315, between a client and a server. All three validators 1305, 1310 and 1315 have the same configuration (destination IP address of 1.2.3.4 and destination port number 84).

As shown in FIG. 13, a connection request is received specifying a destination IP address of 1.2.3.4 and a destination port number 84. Validator 1305 accepts the connection request because the connection request matches the configuration of validator 1305. The message or document is received via one or more packets, and is validated by validator 1305. Because the message .o has been validated, validator 1305 changes the destination port number from 84 to 81 for the packets (for forwarding the message). The validator 1305 then forwards the validated message on to the next node, by sending a connection request to validator 1310, specifying destination IP address 1.2.3.4 and destination port 81. The port number 81 of the connection does not match the configuration of validator 1310. Therefore, validator 1310 does not accept or establish the requested connection. Rather, validator 1310 simply forwards the connection request onto the next node which is validator 1315. Validator 1315 repeats the same process as validator 1310 since the packet does not match the configuration of validator 1315. Validator 1315 then forwards the connection request packet to the server. The server then accepts or establishes the requested connection with validator 1305, and receives the validated message. In this manner, multiple validators may be transparently cascaded together to provide scalability and fault tolerance.

Figure 14:
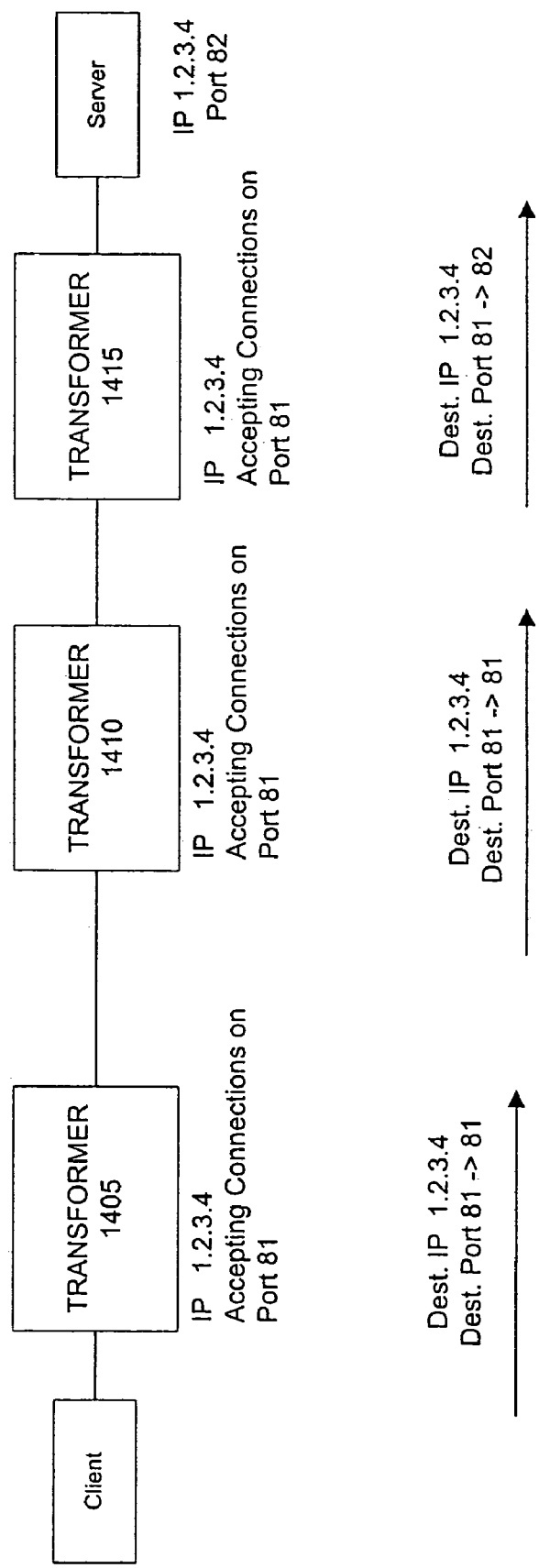
FIG. 14 is a diagram illustrating a cascading of multiple transformers according to an example embodiment.

FIG. 14 is a diagram illustrating a cascading of multiple transformers according to an example embodiment. Transformers 1405, 1410 and 1415 are cascaded (or coupled together serially) between a client and a server. Each transformer 1405,1410 and 1415 are configured with IP address 1.2.3.4 and to accept connections on port 81. Transformer 1405 receives a connection request packet (or SYN packet) from client, specifying destination IP address 1.2.3.4 and destination port number 81. However, transformer 1405 does not have sufficient resources to process (or transform) the message because, for example, it is busy processing other messages. Therefore, transformer 1405 forwards the connection request packet to transformer 1410. However, transformer 1410 has failed or is inoperative, and thus also forwards the connection request to transformer 1415. Transformer 1415 is operative and has resources available to process or transform the message in a timely manner. Thus, transformer 1415 compares the parameters or fields of the connection request packet to its configuration. Because the destination IP address (1.2.3.4) and port number (81) of the request packet match the configuration of the transformer 1415, transformer 1415 accepts the connection request to establish the connection with the client and receives the message or data via one or more packets. Transformer 1415 then transforms the message or data from a first data format to a second data format, and then forwards the transformed message to server via one or more packets using a new connection. The packets used to forward the transformed message to the server include a destination port number of 82 to indicate that the message has already been transformed. In the event that transformer 1415 was unable to process or transform the message, the connection request and message would simply be forwarded unchanged to the server, where it may be processed there.

Figure 15:
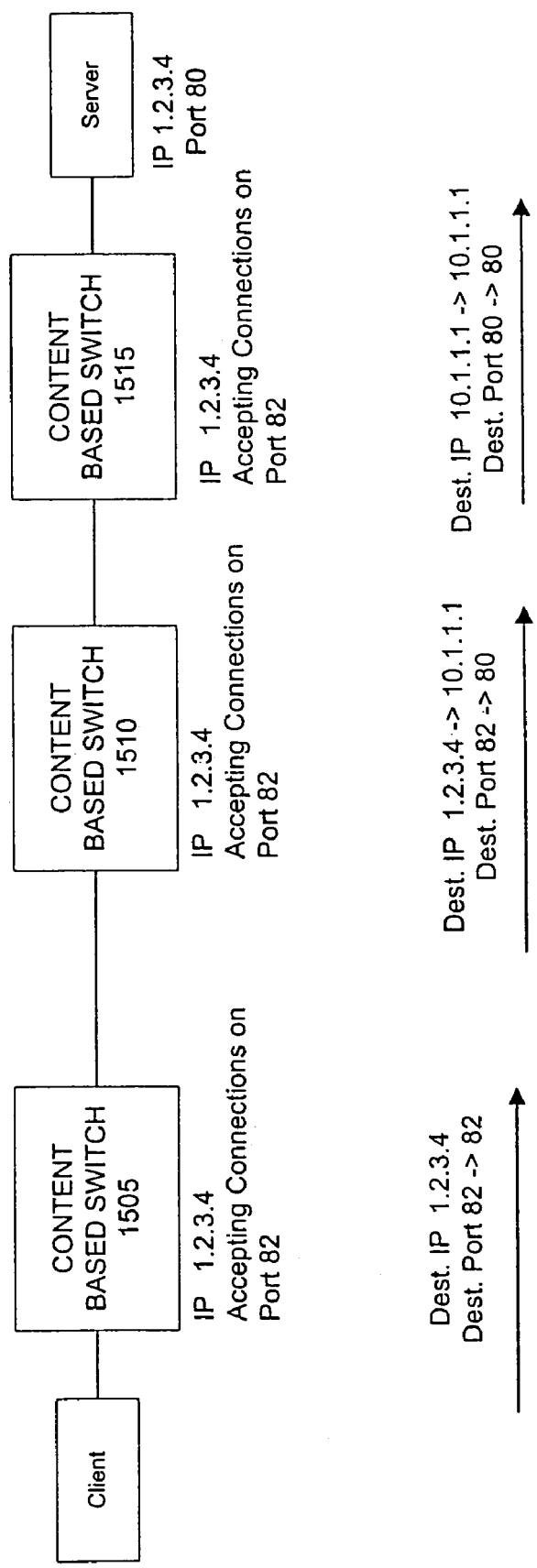
FIG. 15 is a diagram illustrating a cascading of multiple content based switches according to an example embodiment.

FIG. 15 is a diagram illustrating a cascading of multiple content based switches according to an example embodiment. Three content based switches 1505, 1510, and 1515 are cascaded together between a client and a server. According to the embodiment shown in FIG. 15, each of the content based switches are configured with IP address 1.2.3.4 and to accept connection requests on port number 82. Switch 1505 receives a connection request from the client, specifying destination IP address 1.2.3.4 and destination port number 82. While the packet or connection request matches the configuration of switch 1505, switch 1505 is unable to process the message, and thus, forwards the packets, including the connection request and the subsequent packets that send the data or message to be processed, to switch 1510. Switch 1510 has sufficient resources to process or switch the message, and thus accepts the connection request, and receives the message from the client via one or more additional packets.

Content based switch 1510 then performs content based switching on the message by comparing the message or XML data to one or more predetermine patterns or values. For example, the pattern "To=Bookstore.com" provided within the XML data or message may indicate that the message should be directed to or switched to server S1, which has an IP address of 10.1.1.1 (shown in FIG. 15), and is detecting or listening for connections on port number 80, which is a well known port for HTTP.

| Server | IP address | Port | XML pattern |
|---|---|---|---|
| S1 | 10.1.1.1 | 80 | To = bookstore.com |

Because the received message matches the pattern "To=Bookstore.com", the switch then changes the destination IP address and port number to 10.1.1.1 and 80 in the packets, respectively, and forwards the message in these one or more packets to switch 1515. Alternatively, switch may output the message via one or more packets to a different physical port directly to the server S1.

Switch 1515 receives the connection request packet that includes the destination IP address of 10.1.1.1 and port number 80, which does not match its configuration. Thus, switch 1515 forwards the connection request and the other messages forwarding the message onto a server. In addition, the message may pass through another switch that may direct the message to the appropriate server based on IP address and port number. Eventually, the message will reach the intended server, S1. In this manner, multiple content based switches may be cascaded together to handle the switching of a much larger number of messages or transaction, while also providing fault tolerance.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An apparatus comprising:
   an extensible markup language (XML) device coupled between a client and a server, the XML device having a configuration, the XML device to receive a content based message comprising a header and application data provided in one or more fields after the header via one or more received packets and to process the content based message only if the received packets have the one or more fields comprising the application data, if the content of the application data provided after the header in the one or more fields matches the configuration of the XML device, the XML device to forward the processed content based message via one or more packets having one or more fields that are different from the received packets, and wherein the XML device comprises a device to forward the received packets with the one or more fields arid the content based message that are unchanged if the content of the application data in the one or more fields of the received packets do not match the configuration of the XML device.

2. The apparatus of claim 1 wherein the XML device comprises one or more of a validator, a transformer and a content bused switch.

3. The apparatus of claim 1 wherein the content of the application data in the one or more fields that match the configuration of the XML device comprise a destination IP address and destination port number.

4. An apparatus comprising:
a plurality of extensible markup language (XML) devices coupled between a client an a server, the XML devices having a same configuration, the XML devices to receive a content based message comprising a header and application data provided in one or more fields after the header via one or more received packets and to process the content based message only if the received packets have the one or more fields comprising the application data and if the content of the application data in the one or more fields matches the configuration of the XML devices, the XML devices to forward the received packets wit the one or more fields and the message that are unchanged if the one or more fields of the received packets do not match the configuration of the XML devices, the XML devices to forward the content based processed message via one or more packets having one or more fields that are different from the received packets.

5. The apparatus of claim 4 wherein the plurality of XML devices comprise a plurality of validators.

6. The apparatus of claim 5 wherein at least one of the validators comprises a validation accelerator to validate XML documents or content based messages.

7. The apparatus of claim 4 wherein the plurality of XML devices comprise a plurality of transformers.

8. The apparatus of claim 7 wherein at least one of the transformers comprises a transformer to transform the content based message from a first format to a second format.

9. The apparatus of claim 4 wherein the plurality of XML devices comprise a plurality of switches.

10. The apparatus of claim 9 wherein at least one at the switches comprises a content based switch to switch the content based message to a selected processing node or server if the convent of the content based message matches one or more predetermined patterns or values.

11. The apparatus of claim 10 wherein the content based switch comprises a content based switch to switch the content based message to a selected processing node or server if business transaction information in the content based message matches a predetermined pattern or value.

12. The apparatus of claim 4 wherein the content of the application data in the one or more fields that match the configuration of the XML device comprise an address.

13. The apparatus of claim 4 wherein the content of the application data in the one or more fields that match the configuration of the XML device comprise a destination address.

14. The apparatus of claim 4 wherein the content of the application data in the one or more fields that match the configuration of the XML device comprise a destination address and destination port number.

15. The apparatus of claim 4 wherein the content of the application data in the one or more fields that match the configuration of the XML device comprise a destination IP address and destination port number.

16. The apparatus of claim 4 wherein the content of the application data the one or more fields that match the configuration of the device comprise a destination IP address and destination port number on which the XML devices are accepting connection requests.

17. An apparatus comprising:
a first extensible markup language (XML) device having a first configuration;
a second XML device coupled to the first XML device, the second XML device having a second configuration;
the first XML device to receive a content based message comprising a header and application data provided in one or more fields after the header via one or more received packets and to process the content based message only if the received packets have the one or more fields comprising the application data and if the content of the application data provided after the header in the one or more fields matches the configuration of the first XML device, the first XML device to forward the received packets to the second XML device with the one or more fields and the content based message that are unchanged if the content of the application data in the one or more fields of the received packets do not match the first configuration.

18. The apparatus of claim 17 wherein the first XML device to forward the processed content based message to the second XML device via one or more packets having one or more fields that match the second configuration.

19. The apparatus of claim 17 wherein each of the first and second XML devices comprises one or more of a validator, a transformer and a switch.

20. A method comprising:
configuring an extensible markup language (XML) device;
receiving a content based message comprising a header and application data provided in one or more fields after the header at the XML device via one or more packets;
processing the content based message only if the received packets have the one or more fields comprising the application data, the content of the application data provided after the header in the one or more fields matches the configuration of the device;
forwarding the processed content based message via one or more packets having one or more fields that are different from the received packets; and
forwarding the received packets with the one or more fields and the content based message that are unchanged if the content in the application data in the one or more fields of the received packets do not match the configuration of the XML device.

21. The method of claim 20 and further comprising:
generating a response message;
receiving the response message at the XML device via one or mare packets;
processing the response message if the one or more packets of the response message match the configuration of the XML device.

22. An apparatus comprising a media having instructions thereon, the instructions resulting in the following when executed:
configuring an extensible markup language (XML) device;
receiving a content based message comprising a header and application data provided in one or more fields after the header at the XML device via one or more packets;

processing the content based message only if the received packets have the one or more fields comprise the application data, and if the content of the application data provided after the header in the one or more fields matches the configuration of the XML device;

forwarding the processed content based message via one or more packets having one or more fields that are different from the received packets; and forwarding the received packets with the one or more fields and the content based message that are unchanged if the one or more fields of the received packets do not match the configuration of the XML device.

* * * * *

UNITED STATES PATENT AND TRADEMARK OFFICE
CERTIFICATE OF CORRECTION

PATENT NO.        : 7,162,542 B2                                         Page 1 of 1
APPLICATION NO.   : 09/741805
DATED             : January 9, 2007
INVENTOR(S)       : Abjanic et al.

It is certified that error appears in the above-identified patent and that said Letters Patent is hereby corrected as shown below:

On the Title page, Item (56), under "Other Publications", in column 2, line 4, delete "Isreal" and insert -- Israel --, therefor.

In column 21, line 3, in Claim 2, delete "bused" and insert -- based --, therefor.

In column 21, line 20, in Claim 4, delete "wit" and insert -- with --, therefor.

In column 21, line 39, in Claim 10, after "one" delete "at" and insert -- of --, therefor.

In column 21, line 42, in Claim 10, delete "convent" and insert -- content --, therefor.

In column 21, line 66, in Claim 16, after "data" insert -- in --.

In column 22, line 54, in Claim 21, delete "mare" and insert -- more --, therefor.

Signed and Sealed this

Second Day of October, 2007

JON W. DUDAS
*Director of the United States Patent and Trademark Office*